United States Patent [19]
Weidler

[11] 3,916,616
[45] Nov. 4, 1975

[54] CHAIN LOCK

[76] Inventor: Erhard Alfred Weidler, Jahnstrasse, 7084 Unterkochen, Wurttemberg, Germany

[22] Filed: Jan. 14, 1974

[21] Appl. No.: 432,810

[30] Foreign Application Priority Data
Jan. 16, 1973 Germany............................ 2302457

[52] U.S. Cl......................................... 59/85; 59/93
[51] Int. Cl.²............................................. F16G 15/04
[58] Field of Search.............. 59/85, 86, 84, 89, 93; 152/244, 231, 233

[56] References Cited
UNITED STATES PATENTS

| | | | |
|---|---|---|---|
| 247,952 | 10/1881 | Schneider | 59/86 |
| 2,538,356 | 1/1951 | Donda | 59/85 |
| 3,404,528 | 10/1968 | Dicus | 59/85 |
| 3,559,713 | 2/1971 | Mueller | 59/85 |
| 3,685,285 | 8/1972 | Spilhaug | 59/86 |

FOREIGN PATENTS OR APPLICATIONS
1,242,835  8/1971  United Kingdom.................... 59/85

Primary Examiner—C. W. Lanham
Assistant Examiner—Gene P. Crosby
Attorney, Agent, or Firm—Smythe & Moore

[57] ABSTRACT

A chain lock for lockingly retaining the links of a chain together comprising a bow-like basic element having the ends spaced to define an entry slot and formed with flange-like projections, and a locking element having a circular groove therein for receiving the projections. Arresting elements extending across the groove and engaging and locking the elements together.

10 Claims, 10 Drawing Figures

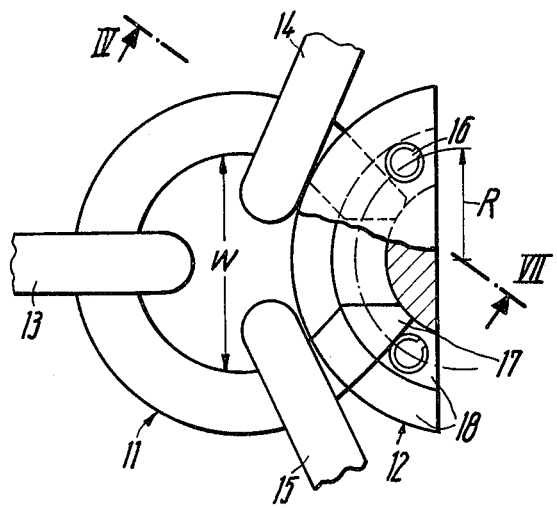
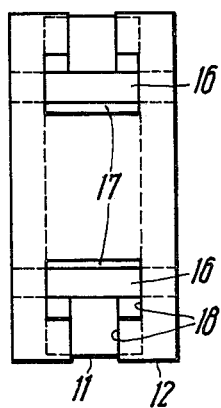
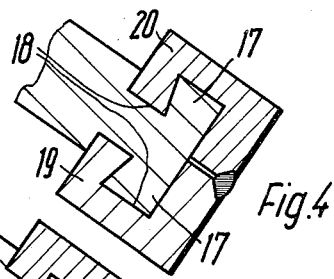
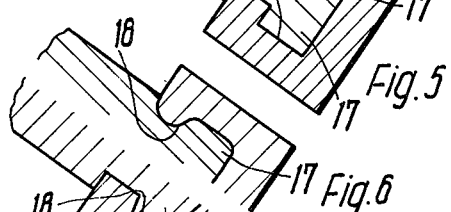
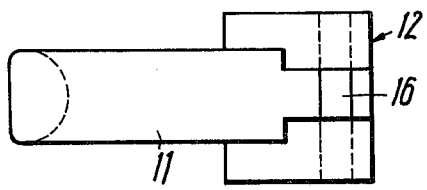
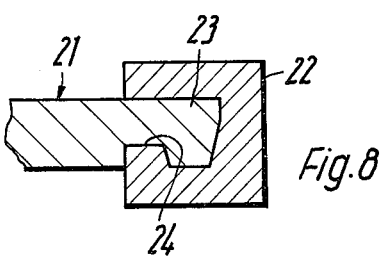

CHAIN LOCK

The invention relates to a chain lock consisting of a bow-like basic element, in which the ends defining the entry slot are provided with flange-like projections which fit into adjoining recesses of a locking element serving to bridge the entry slot, the locking element being lockable by at least one arresting element in the locking position.

Already known is a chain lock of the kind mentioned above having a cap-shaped basic element, in which in the basic element plane the cap is slidable sideways over the flange-like projections of the basic element (German Utility Model No. 1,910,331). The known chain lock is unsatisfactory for several reasons. One of the reasons is that for production the basic element has an unfavorable shape, which can only be produced economically by drop forging, i.e. in large numbers. Another reason is that the planes of the flange-like projections of the basic element, from which the forces are transferred to the locking element, must run parallel to each other. Such a parallel course of the planes is especially unfavorable when the ends of the basic element are not straight but bent, as is often desired. Furthermore in the known chain lock it is necessary that the arresting elements are not only led in the locking element but that they must also support themselves against parts of the basic element if safe locking is to be guaranteed.

It is the aim of the invention to develop a chain lock of the type described in the beginning hereof which is of simple construction, easily assembled and which meets the requirements for a favorable transmission of the forces between the basic element and the locking element. According to the invention this aim is accomplished in that the recesses in the locking element are formed by parts of a groove with a cross-section tapering off toward the basic element.

The chain lock according to the invention offers the advantage that the circular ring-shaped groove is relatively easy to produce, that the locking element can easily be actuated into locking position by swinging and that in the region of the bridge, formed by the locking element a favorable flow of force is obtained. The arrangement of the coupling between the locking element and the parts operating the basic element is arranged in such a way, that the inclination of the basic element to move to the outside when under strain, is effectively suppressed. Forces working on the locking element from the inside or the outside do not have to be received by the arresting elements since a close connexion exists between the locking element and the basic element ends not only vertical to the direction of the entry slot but also in the direction of the entry slot The invention is explained in greater detail hereinafter with the aid of a plurality of illustrations in the drawing attached hereto, wherein:

FIG. 1 shows a section of a chain lock, which connects three links of a tire chain with each other;

FIG. 2 shows the chain lock according to FIG. 1 viewed from the right;

FIG. 3 shows the chain lock according to FIG. 1 viewed from the top;

FIG. 4 to 7 show possible profiles of the ends of the basic element and the groove meant for their reception viewed from the sectional plane IV–VII;

FIG. 8 shows a section according to FIG. 4 to 7 through a construction wherein the groove of the locking element and the ends of the basic element are L-shaped;

Figure 9:
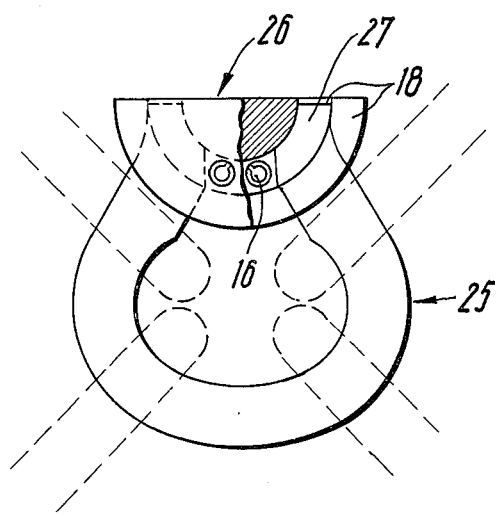
FIG. 9 shows the view of a chain lock of different construction with a Ω shaped basic element and FIG. 10 shows the view of a chain lock with a C-shaped basic element.

In FIGS. 1 to 3 the basic element and the locking element are 11 and 12 respectively of a first chain lock. By means of the basic element 11 three links 13,14 and 15 of the net of the tread of a tire chain are connected with each other. Arresting elements 16 hold the locking element 12 in its nominal position. While the basic element is provided with flange-like projections 17, the locking element has a T-shaped groove 18, of which the parts, that form the beam of the T, carry the projections 17. Different possibilities for the development of the T-shaped groove 18 and its adjoining projections 17 are shown in FIG. 4 to 7.

While the locking elements according to FIGS. 1,2,3,5,6, and 7 each consist of one part, the locking element according to FIG. 4 is made of two parts 19 and 20, which are connected by suitable means, for example by welding. The two part version offers the advantage of a simpler production.

FIG. 8 shows basic elements 21 and 22, in which the end of the basic element 23 and the groove 24 in the locking element 22 are L-shaped. It is understood, that generally preference will be given to the solution with a symmetrical groove, as shown in FIGS. 4 to 7.

The main dimensions of the basic element 11 and the locking element 12 are chosen in such a way that the center radius R of the parts of the groove 18 which receives the flange-like projections equal a quarter to a half – preferable a third – of the inner width W of the basic element.

While in the embodiment according to FIGS. 1 to 3 a generally C-shaped basic element is used, the chain lock according to FIG. 9 is a Ω-shaped basic element 25. The construction of the locking element 26 corresponds largely with that of the locking element 12. Only the positiion of the bores for the arresting elements 16, which are in this case arranged in the region of the entry slot for the links to be connected with each other, have changed. The projections 27 at the ends of the basic element 25 have, viewed vertically to the basic element plane, the shape of circular ring-shaped runners.

Figure 10:
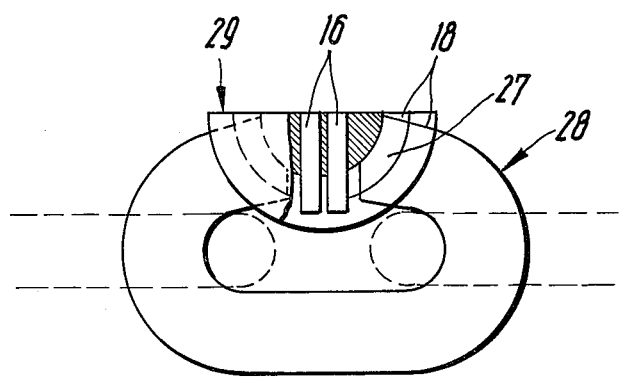

FIG. 10 shows a chain lock with a basic element 28 which is mainly C-shaped and a locking element 29, in which the arresting elements 16 run parallel to the entry slot for chain links which are marked by broken lines. Here too circular ring-shaped projections 27 are used.

Several modifications of the basic conception according to the invention are possible. For example in FIG. 1 the arresting elements 16 could be arranged between the projections 17 according to FIG. 9. In this way the size of the locking element could be reduced, since its parts which are outside the projections 17 could be omitted. In this case two rather than three locking elements could be made out of one circular blank. Also, in the embodiment according to FIG. 1, one of the arresting elements 16 could be replaced by a side bar which is tightly connected with the locking element or which forms one piece therewith, and closes the one end of the groove 18. The use of a circular ring-shaped groove and corresponding supporting surfaces on the projections always insures the realization of the advantages claimed.

I claim:

1. A chain lock for chain links comprising a bow-like basic element having the ends spaced to define an entry slot, tapered flange-like projections on said ends, a locking element having an arcuate generally T-shaped groove therein for bridging said entry slot and receiving said projections, and at least one arresting element extending across said groove and engaging with at least one of said projections whereby said basic element is locked to the chain links.

2. A chain lock according to claim 1 wherein said basic element is generally C-shaped.

3. A chain lock according to claim 1 wherein said basic element is generally oval shaped.

4. A chain lock according to claim 1 wherein said basic element is generally U-shaped.

5. A chain lock according to claim 1 wherein said groove is tapered and said projections are correspondingly shaped for snug and slidable movement therein.

6. A chain lock according to claim 1 wherein the center radius from the center of said locking element and extending to generally the center of said T-shaped groove approximately equals substantially a third of the inner width between and at generally the center of the sides of said basic element.

7. A chain lock acording to claim 1 wherein at least two arresting elements extend across said groove between and engage the ends of said basic element.

8. A chain lock according to claim 1 wherein at least two arresting elements extend across said groove outside of and engage the ends of said basic element.

9. A chain lock according to claim 1 wherein said groove is of circular ring-shape and its curvature corresponds to that of said projections.

10. A chain lock according to claim 9 wherein said locking element is in two parts interconnected adjacent to said groove.

* * * * *